Feb. 22, 1949.    D. W. BROWNE    2,462,607
HEATING ELEMENT
Filed March 1, 1945
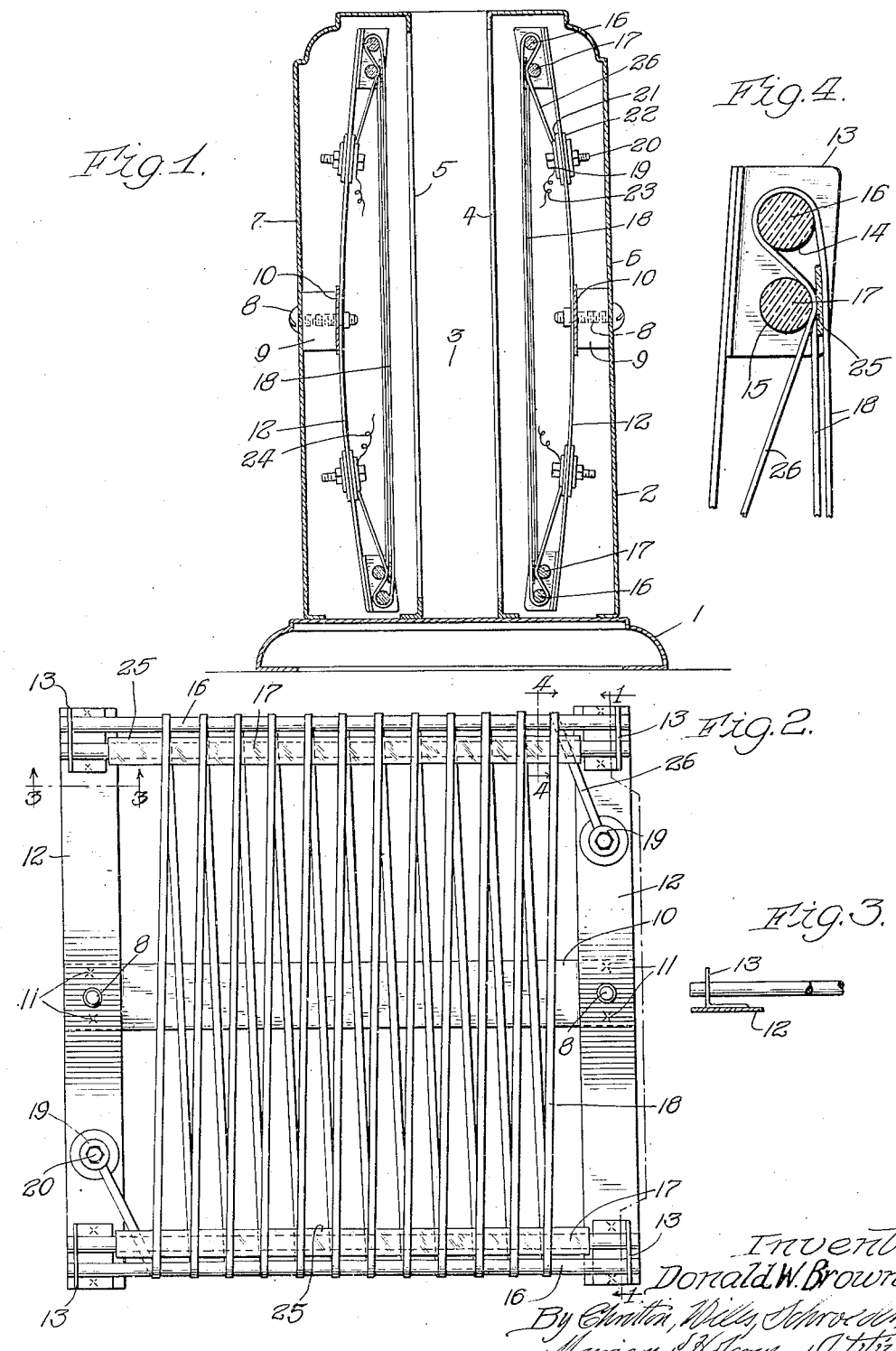

Patented Feb. 22, 1949

2,462,607

UNITED STATES PATENT OFFICE 2,462,607

HEATING ELEMENT

Donald W. Browne, Chicago, Ill.

Application March 1, 1945, Serial No. 580,395

7 Claims. (Cl. 219—19)

My invention relates to a heating device and more particularly to such device having electrical heating elements, and a novel arrangement of parts including a space wound heating element in which the strands are always held taut regardless of the expansion and contraction of the element due to heat changes.

While not limited thereto, because of having usefulness in other fields, my invention is especially adapted for use in electrical toasters in which connection, and for illustrative purposes only, I have shown and described it. All electrical toaster heating elements in conventional use prior to my invention, so far as I am aware, have the resistance wire wound on a mica sheet usually in the neighborhood of four inches by five inches in dimension, which wire gives some trouble with loosening up by reason of considerable expansion when heated. This trouble I have overcome by providing a resistance or heating unit of what may be termed the "space wound" type, the resistance wire being supported by spaced rods of appropriate insulating material, with nothing but air in between, and in which device there is a spring mounting for the supporting rods such that these parallel rods move further apart or closer together depending upon the expansion and contracting of the resistance wire between hot and cold conditions. This prevents the resistance wire from sagging, shifting out of position, and contacting other turns. Also the present invention embodies the highly desirable feature of having the up and down strands or turns of the resistance wires located in substantially a single plane so that the heating effect, on for example a slice of bread is much more uniform. Moreover, the omission of the mica form enables the element to come up to full heat practically instantaneously.

Among the objects of my invention are to overcome the difficulties, and accomplish the advantages, referred to above; further to provide the arrangement of parts referred to above, in combination with a reflector plate on the outside of the heating element to reflect back as much heat as possible which might otherwise go out and be wasted; also the feature of providing a pair of bowed or slightly arched resilient members constantly to urge the parallel rods on one end of the resilient member or members away from the parallel rods on the other end, to maintain the resistance wire in taut condition; further so to arrange the turns or strands of the wire so that they will be in approximately the same plane; also to provide a novel support for the turns of resistance wire for the purposes set forth; and such further objects, advantages and capabilities, inherently possessed by my invention, as will later more fully appear.

My invention further resides in the combination, construction and arrangement of parts illustrated in the accompanying drawings and while I have shown therein a preferred embodiment I wish it understood that the same is susceptible of modification and change without departing from the spirit of my invention.

In the drawings:

Fig. 1 is a vertical transverse sectional view of a toaster taken just inside of one end of the housing, on the line 1—1 of Fig. 2, but showing two elements facing each other and spaced apart a suitable distance for toasting bread or the like.

Fig. 2 is a side elevation of a heating element and its supporting means, constructed in accordance with the present invention.

Fig. 3 is a fragmentary horizontal transverse section on the line 3—3 of Fig. 2.

Fig. 4 is an enlarged fragmentary vertical transverse section on the line 4—4 of Fig. 2.

Referring more in detail to the drawings, my invention, for illustrative purposes only, is shown in Fig. 1 as applied to a toaster comprising a base 1 upon which is suitably mounted a casing 2 having a vertical slot 3 formed therein to receive a slice of bread or the like, which slot is open at the top to allow entry and removal of said slice. Each of the said walls forming the slot 3 are provided with facial openings 4 and 5 extending in area throughout an area corresponding to that of the heating elements to facilitate passage of heat from the heating elements to the slice of bread or the like in the slot 3. Secured to the side walls 6 and 7 of the casing, by screws or the like 8 on each side of the toaster are any desired number of spacing blocks 9 (preferably of insulating material) to the inner faces of which are secured the brace member 10 to the ends of which are secured by spot welding (indicated at 11) the resilient members 12, formed of slightly arched spring steel or other suitable flexible material.

Fixed to each end of each of these resilient members 12 is an angle member 13 provided with a pair of vertically spaced openings 14 and 15, within which are mounted the adjacent ends of the rods, bars, strips, or other suitable resistance-element-supporting members 16 and 17. As seen in Fig. 2 these resistance-element-supporting members 16 and 17 extend from one of the resilient members 12 to the other resilient member 12 to bridge the gap therebetween, there being a pair of these members at each end of the resilient members 12. The spacing between the resistance-element-supporting members (which for convenience will be hereinafter referred to as rods but including other cross sectional shapes than round) of each pair is shown generally in Fig. 4, but other spacing may be utilized without departing from the spirit of my invention, the main requirement being that such spacing is such as to accomplish the purposes set forth herein.

The resistance elements 18 (which may be wires, flat strips, or other shapes if desired) have fixed to each end a terminal eyelet 19, which is secured in place by the screw or the like 20, against the insulating washer 21 in order to insulate the resistance element from the resilient member 12. To further insure this insulation, an insulating washer 22 is secured to the opposite side of the resilient member and an insulating member placed within the opening through which the screw 20 passes through the resilient member. A similar connection for the opposite end of the resistance element to the other resilient member is provided as shown in Fig. 2. To the first of these is connected an end 23 of an inlet wire from an electrical source, while to the other is an outlet wire 24 connected to complete the circuit, suitable switches being provided in the circuit as desired. A similar construction is provided in the opposite one of these heating elements as will be understood in Fig. 1.

In passing the resistance element up and down around the two pairs of rods 16 and 17, the resistance element will be drawn tight enough to bow to the desired extent the resilient members 12. The resilient members will, under such action, tend to straighten out which will maintain the strands or turns of the resistance element in a taut condition. The end portion 26 of the resistance element will extend from the terminal 20 at an angle (see Fig. 2) upwardly, and to the left hand side (as viewed in Fig. 1) of rod 17, then upwardly to the right hand side of rod 16 and around this rod and straight downwardly to bottom rod 16 of the other pair of rods, thence around the same and upwardly along the left hand side of the rod 17 of the bottom pair, thence upwardly at a point spaced a slight distance laterally (see Fig. 2) then over the left hand side of rod 17 of the upper pair, then upwardly and around the right hand side and top of rod 16 of the upper pair, then downwardly at a slight angle to the left hand side of rod 16 of the bottom pair, and so on to continue this winding of the resistance element until it is complete in the manner shown in the drawings, and finally securing the end terminal 19 to the terminal screw or binding post 20 of the left hand resilient member 12 as viewed in Fig. 2.

During this winding of the resistance element around the upper and lower pairs of rods a strip of mica 25 will be positioned between the overlapping strands at the front side of each of the rods 17 to prevent current leakage between these portions of the resistance element.

The inside faces of the side walls 6 and 7 of the housing 2 will preferably be provided with a coating of chromium (or if desired, these side walls may be made of chromium steel) and polished brightly to serve as a reflector to reflect the heat rays to the inside and prevent, as much as possible, heat rays from becoming lost to the outside of the housing. This will further direct the heat against the slice of bread or the like being toasted, or any other object being heat treated, and thus increase the efficiency of the heating device. It is also important to note that the up and down strands of the resistance element will be approximately in the same plane (at least closely adjacent planes), and thus more evenly apply the heat to the slice of bread being toasted or other object being heat treated.

While as stated earlier herein I have shown and described my invention as applied to a toaster, I wish it understood that my novel heating element may be applied for use in any heating device to which it may be adaptable. The angle members 13, forming the supports for the ends of the insulating rods 16 and 17, may be spot welded, or secured in any other manner desired, to the ends of the resilient members 12. As will be understood the wires 23 and 24 may be connected to any suitable source of electric current, the flow of which will heat the resistance elements in a manner well understood which heating will be discontinued when the current is cut off.

I claim:

1. In a heating device, an elongated resilient member, a pair of spaced apart rods supported at each of the end portions of the resilient member, at least the surface of said rods being of insulating material, and a resistance element wound back and forth over said rods with sufficient tightness to bend the resilient member into bow-shape to constantly hold the resistance element taut, the resistance element passing to one side of one rod and around the other rod of each pair of rods so that their main heating portions will lie in substantially the same plane.

2. In a heating device, a pair of spaced apart elongated resilient members having at each of their ends a pair of spaced apart resistance-element-supports of insulating material, and a resistance element wound back and forth over said supports with sufficient tightness to bend the resilient members into bow-shape to constantly hold the resistance element taut, the resistance element passing around one support and along one side only of the other support of each of said pairs so that its main heating portions will lie in substantially the same plane.

3. In a heating device, a pair of elongated resilient members spaced apart edgewise from each other, a pair of laterally spaced apart rods mounted on each of the end portions of said resilient members, a resistance element of substantial length passing back and forth over the two pairs of rods, the element where passing over one of the pairs of rods being positioned over the front face of the inner rod, then extending to the rear face of the outer rod, over the same and down the front face thereof past the other rod of the pair to the next pair of rods where it passes the front face of the outer rod and then over this rod and back up over the front face of the inner rod of this pair, and back to the first pair, and so on at spaced intervals for the length of the device.

4. In a heating device, a pair of elongated resilient members spaced apart edgewise from each other, a pair of laterally spaced apart rods mounted on each of the end portions of said resilient members, a resistance element of substantial length passing back and forth over the two pairs of rods, the element where passing over one of the pairs of rods being positioned over the front face of the inner rod, then extending to the rear face of the outer rod, then over the same and down the front face thereof past the other rod of the pair to the next pair of rods where it passes the front face of the outer rod and then over this rod and back up over the front face of the inner rod of this pair, and back to the first pair, and so on at spaced intervals for the length of the device, the sections of the resistance element that pass one over the other at the front face of the inner rods being insulated from each other.

5. In a heating device, a frame work comprising two end members of bowed resilient material, means holding said end members spaced apart, rod-holding means on each end of each resilient end member, a pair of laterally spaced apart insulating rods supported at their ends in said rod-holding means so as to have one pair of rods extending between the ends of the resilient end members on one edge of the device and another pair of similarly arranged rods on the opposite edge of the device, and a resistance element passed back and forth a number of times over the two pairs of rods, those portions of the resistance element passing back and forth from one pair of rods to the other pair of rods being in substantially the same plane, and all passing to one side only of one rod of each pair.

6. In a toaster having a housing provided with two spaced apart side compartments and a slot therebetween, each of said compartments having therein a heating device comprising: a pair of edgewise spaced arched resilient members, a pair of spaced insulating rods secured to the adjacent ends of the resilient members at one side of the device and a similar pair of rods secured to the other ends of the resilient members, a resistance element passed back and forth over and between the two pairs of rods, the arched resilient members holding the back and forth turns of the resistance element taut, the said turns lying in substantially the same plane and passing over only one lateral side of one rod of each pair, and said turns facing said slot to radiate heat against a slice of bread or the like in the toaster.

7. In a toaster having a housing provided with two spaced apart side compartments and a slot therebetween, each of said compartments having therein a heating device comprising: a pair of edgewise spaced arched resilient members, a pair of spaced insulating rods secured to the adjacent ends of the resilient members at one side of the device and a similar pair of rods secured to the other ends of the resilient members, a resistance element passed back and forth over and between the two pairs of rods, the arched resilient members holding the back and forth turns of the resistance element taut, the said turns in their main active portions lying in substantially the same plane, and said turns facing said slot to radiate heat against a slice of bread or the like in the toaster, and a heat reflecting surface back of each of said heating devices to reflect heat toward said slice of bread when the toaster is heated.

DONALD W. BROWNE.

REFERENCES CITED

The following references are of record in the file of this patent:

UNITED STATES PATENTS

| Number | Name | Date |
| --- | --- | --- |
| 250,094 | Mott et al. | Nov. 29, 1881 |
| 622,748 | Woodman | Apr. 11, 1899 |
| 1,065,015 | Youmans | June 17, 1913 |
| 1,155,835 | Murphy | Oct. 5, 1915 |
| 1,335,483 | Colby | Mar. 30, 1920 |
| 1,632,034 | Moffit | June 14, 1927 |
| 1,963,409 | Johnson | June 19, 1934 |
| 2,025,898 | Rhodes | Dec. 31, 1935 |

FOREIGN PATENTS

| Number | Country | Date |
| --- | --- | --- |
| 125,147 | Switzerland | Apr. 2, 1928 |